Oct. 18, 1927.
C. BARADAT
1,646,341
CINEMATOGRAPHIC APPARATUS ADAPTED FOR THE CONTINUOUS TRAVEL OF THE FILM
Filed Sept. 8, 1925    7 Sheets-Sheet 1
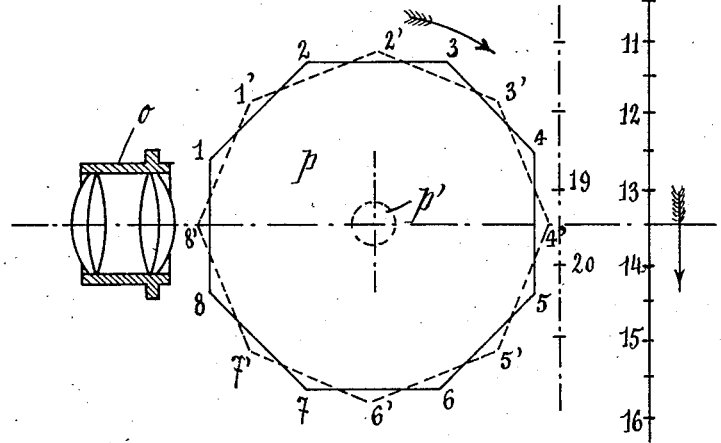
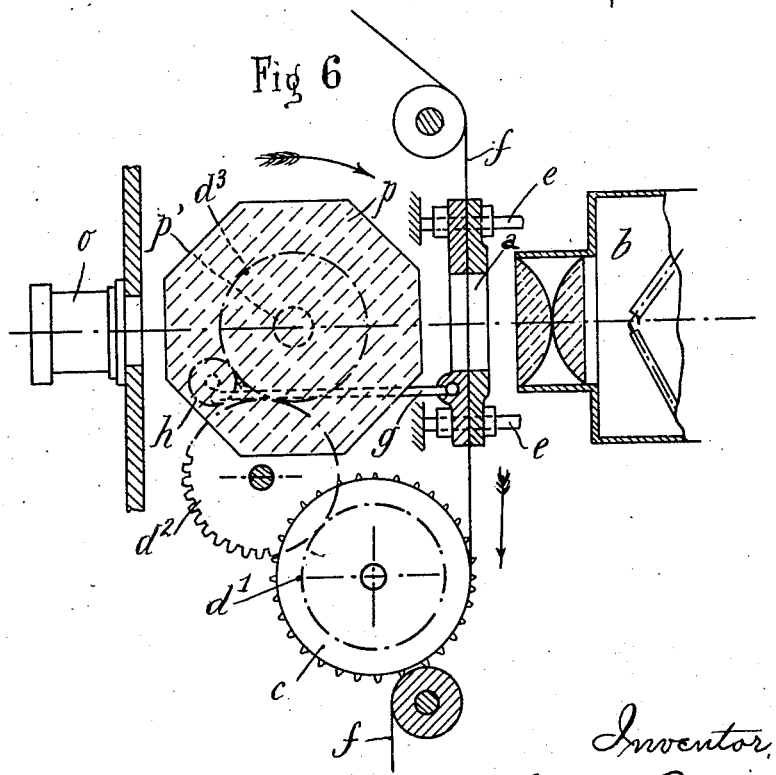

Oct. 18, 1927. 1,646,341
C. BARADAT
CINEMATOGRAPHIC APPARATUS ADAPTED FOR THE CONTINUOUS TRAVEL OF THE FILM
Filed Sept. 8, 1925 7 Sheets-Sheet 2
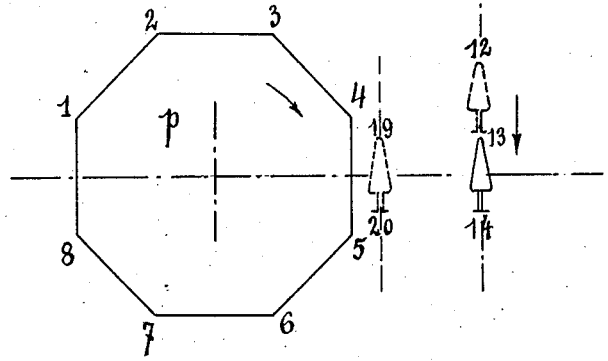
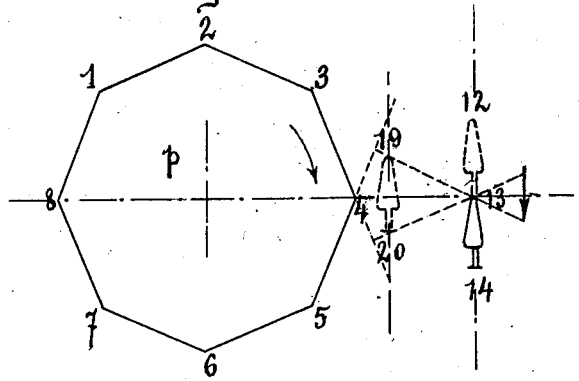
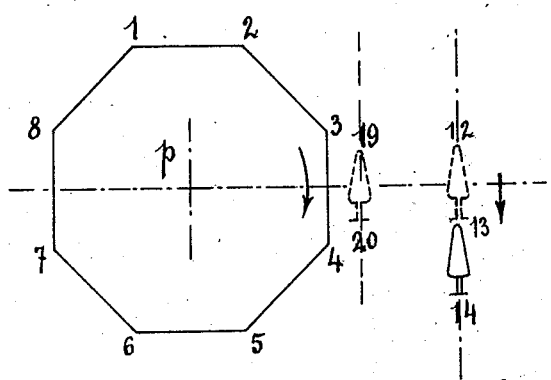
Inventor,
Claudio Baradat,
By [signature], Atty.

Oct. 18, 1927.

C. BARADAT 1,646,341

CINEMATOGRAPHIC APPARATUS ADAPTED FOR THE CONTINUOUS TRAVEL OF THE FILM

Filed Sept. 8, 1925    7 Sheets-Sheet 4

Oct. 18, 1927.

C. BARADAT 1,646,341

CINEMATOGRAPHIC APPARATUS ADAPTED FOR THE CONTINUOUS TRAVEL OF THE FILM

Filed Sept. 8, 1925    7 Sheets-Sheet 5

Inventor
Claudio Baradat.
By
Atty.

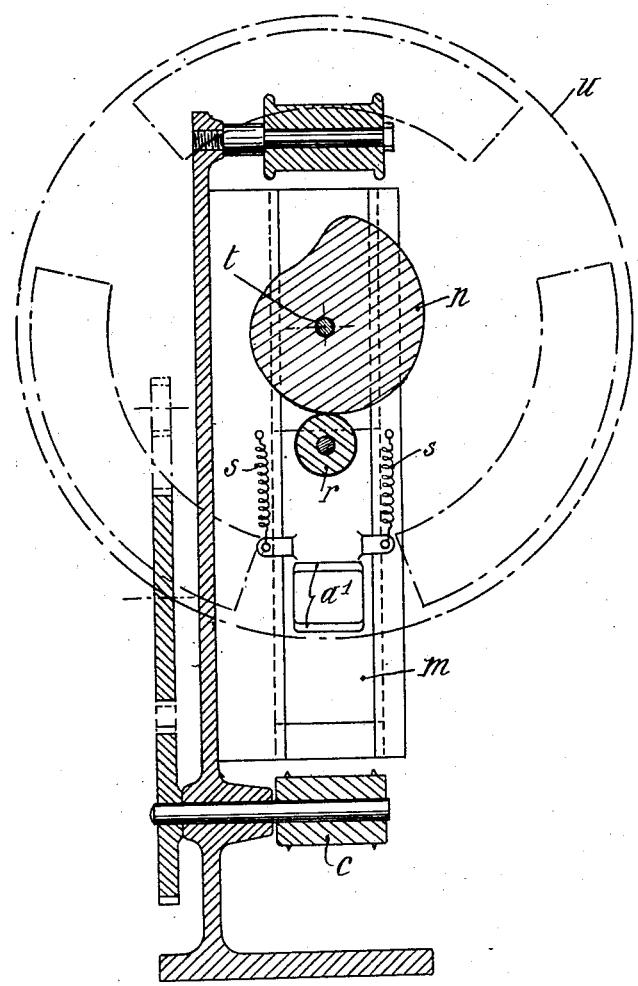

Patented Oct. 18, 1927.

1,646,341

UNITED STATES PATENT OFFICE.

CLAUDIO BARADAT, OF BARCELONA, SPAIN.

CINEMATOGRAPHIC APPARATUS ADAPTED FOR THE CONTINUOUS TRAVEL OF THE FILM.

Application filed September 8, 1925, Serial No. 55,025, and in Spain September 22, 1924.

It has already been proposed to utilize for cinematographic projections a system of lenses rotating in front of the film which travels forward in a continuous manner, and since the displacement of the virtual images of the views or photographs of the film, takes place inversely to the displacement of the said film, a compensation will be afforded by which the virtual images will be stationary. But this method of projection has a fundamental drawback consisting in the fact that the images are subjected to distortions according to the region of the lenses traversed by the beams of light employed for the projection.

The present invention has for its object an apparatus for cinematographic projection in which the film no longer travels according to a jerky motion, but with a uniform and continuous motion, thus obtaining projection in which all distortion is obviated.

The apparatus is characterized by the interposition between the objective and the film of a regular prism made of glass or like transparent substance and having an even number of faces, the angular displacement of the prism being in synchronism with the continuous displacement of the film, so that one film view passes through each face of the prism.

The invention further relates to a special disposition of the window or gate for the travel of the film whereby the latter is caused to move from or towards the said prism so as to maintain the virtual images in the same plane.

I have devised a special arrangement of movable frame which forms an image-limiting device, i. e. it frames in the film view and accompanies it during its descent in such manner as to allow the descent of only a single view, whatever may be the position of the prism.

With the said device I obviate the drawback inherent in this class of cinematographic apparatus, consisting in the fact that it is impossible to obtain the simultaneous superposition of two distinct views upon the screen.

In one form of construction, the said movable frame is formed by the shutter itself, which is provided for this purpose with a special groove or slot of suitable shape, and is placed against the film, said shutter being given a continuous rotation. In a modification, the shutter and the movable frame or image-limiting device are distinct from one another, and the latter is given a reciprocating motion, with quick return.

The following description with reference to the appended drawings which are given by way of example sets forth the manner in which the invention is carried into effect.

Fig. 1 is a diagrammatic view of the apparatus.

Figs. 2, 3 and 4 show diagrammatically the formation of the stationary virtual images during the travel of the film.

Fig. 6 shows a form of construction of the projection apparatus, with alternate displacement of the film.

Figs. 10 and 11 show a modification of the said projection apparatus in which the shutter and the image-limiting device form separate elements.

Figure 5:
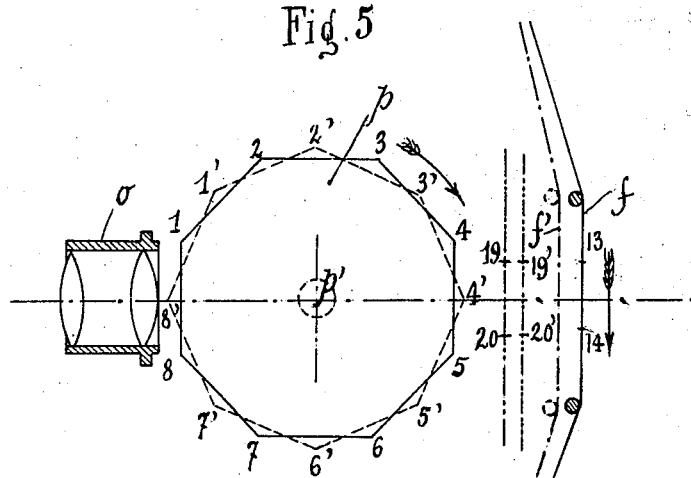
Fig. 5 is a diagram corresponding to Fig. 1, showing the alternate displacement of the film towards the front and rear.

As shown in Fig. 1, the cinematographic projection apparatus essentially comprises a regular prism having parallel faces $p$ (having for example eight faces in the present example) which is rotatable in the direction of the arrow and is disposed between the objective $o$ and the film $f$ which also travels in the direction of the arrow. The said prism rotates on its axis at a uniform speed, which is synchronous with the speed of travel of the film. This synchronism is such that when one of the faces of the said prism is substituted for another face, an image of the film is in like manner substituted for the preceding image.

In these conditions, if the several edges of the prism are numbered 1, 2, 3 ... 8, and the edges of the images of the film $f$ 9, 10, 11 ... 16, it will be observed (Fig. 2) that if the said prism occupies the position indicated in this figure, the view 13, 14 of the film will produce by refraction in the parallel-faced plate 4, 5 and 1, 8, a virtual image 19—20, having the same size as the view and situated nearer the prism than the said view.

When the prism is rotated into the position shown in Fig. 3 (in which the edges of the prism are indicated by 1', 2' . . . 8') the views 12, 13 and 13, 14 will have moved forward by a corresponding distance; it will be thus observed that these two views will afford—by refraction respectively in the parallel-faced plates 3' 4', 7' 8' and 4' 5', 8' 1'—virtual images which will be superposed at 19 and 20.

When the said prism assumes the position shown in Fig. 4 in which the face 3—4 is substituted for the face 4—5 in front of the film, the view 12—13 will now afford, in the parallel-faced plate 3, 4, 7, 8, a virtual image at 19, 20.

It will follow from what preceded that by reason of the synchronism of the prism and the film, the objective $o$ will no longer project real views 9, 10; 11, 12; 15, 16, but a series of virtual images which will be substituted for one another at 19 and 20, i. e. they will assume a stationary position.

In the example herein represented, the face of each prism is given a height which corresponds to two film images.

By a more detailed observation of the projection conditions, it will be found that the virtual images of the film produced by the prism in its two positions 1—2—3—4—5—6—7—8 and 1'—2'—3'—4'—5'—6'—7'—8' are not situated at exactly equal distances. In reality, the virtual image produced by the prism in the position shown in Fig. 5 is spaced at a somewhat greater distance from the centre of the prism. In Fig. 5, 19' 20' shows the position of the virtual images of the view 13—14 corresponding to the positions shown in Figs. 2 and 3. It is an easy matter to bring the virtual image 19' 20' into the plane of the image 19, 20 by bringing the film $f$ into the position $f'$ shown in the dot and dash lines in Fig. 2; the film is then brought into the position $f$, and so on for each rotation of the prism whereby one face is substituted for another.

It will be observed that I may employ all suitable mechanical arrangements affording this alternate displacement of the film from front to rear and inversely, without departing from the spirit of the invention.

Fig. 6 shows a form of construction in which the regular prism $p$ having eight faces is rotatable on its axis $p'$ and is interposed between the projection objective $o$ and the window $a$ across which the film $f$ travels. At the rear of the said window is disposed the projection lantern $b$.

The continuous travel of the film $f$ is assured by the toothed roller $c$ which is connected by the gear wheels $d^1$ $d^2$ $d^3$ with the prism $p$, the gear ratio being such that the film will advance by one view when one face of the prism comes into the place of the preceding. The window $a$ may be made slidable upon rods $e$, and it is given a reciprocating motion by means of the ball $g$ and the crank disk $h$ which is actuated by one of the gear wheels $d^2$ or $d^3$. This reciprocating motion will correct the differences in the focal distances of the prism in its various positions.

Figure 7:
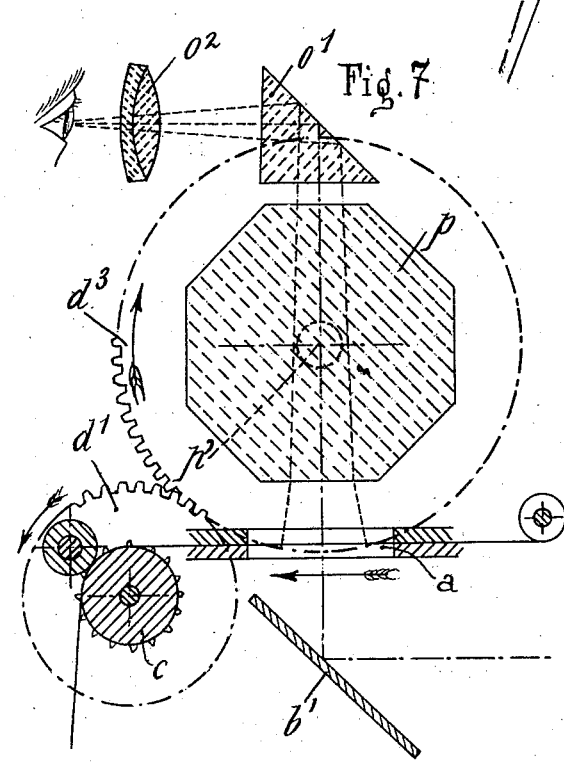
Fig. 7 is a modified form of the apparatus, affording the direct vision of the film.

Fig. 7 represents a modified form of the apparatus which enables the direct vision of the film; for this purpose I provide at the rear of the window $a$, a mirror $b$ or like means of lighting, and I replace the objective $o$ by an optical system for reversing the image, consisting for example of a total reflection prism $o^1$ and an eye-piece $o^2$. In this device, the pinion $d^1$ which is secured to the entraining roller $c$ is in direct engagement with the pinion $d^3$ which is secured to the prism $p$.

Figure 8:
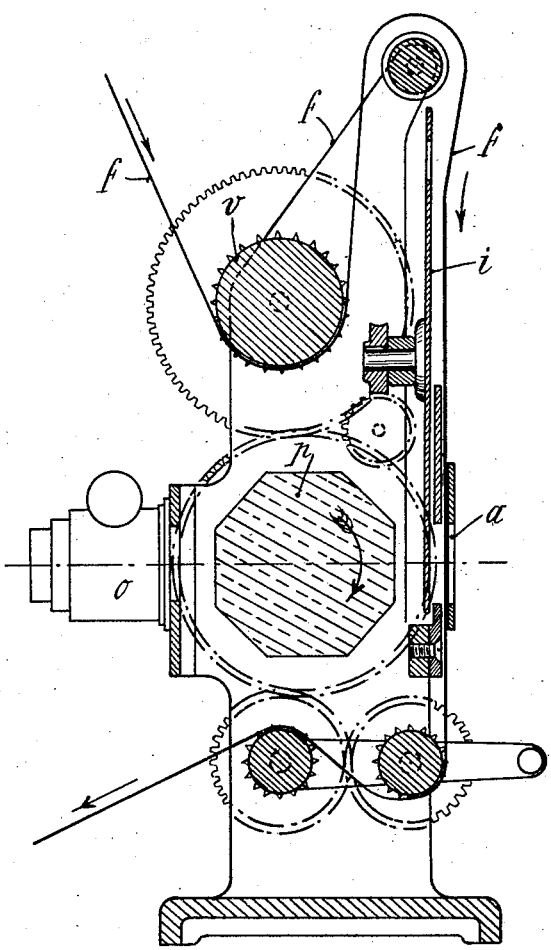
Figs. 8 and 9 show a transverse section and a front view of a projection apparatus provided with a rotatable shutter forming an image-limiting device.
Figure 9:
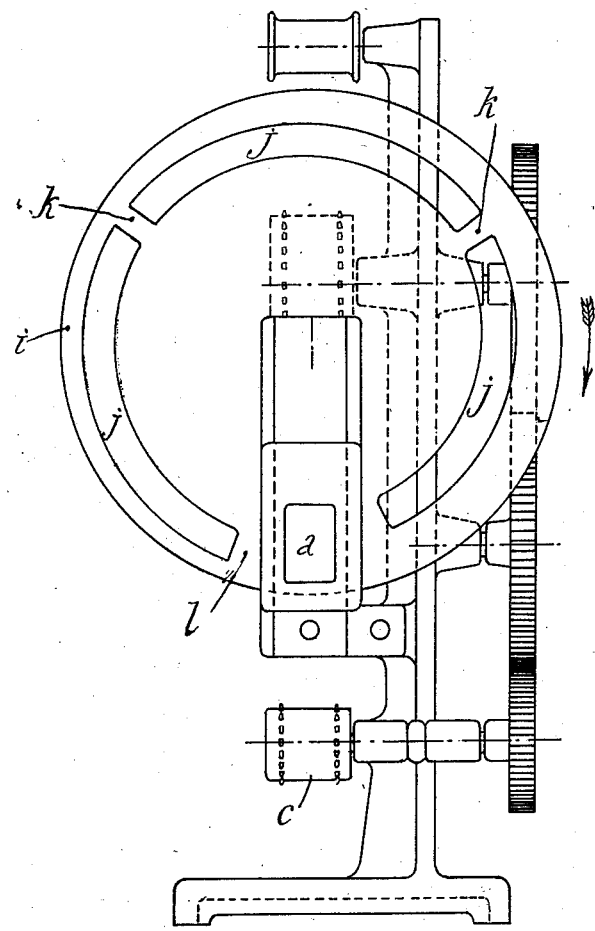

In the cinematographic apparatus with continuous motion, the object of the invention, the height of the window $a$ is at least equal to the height of two cinematographic views, in order to effect the integral projection of each view, but this height of two views makes it necessary to project two views simultaneously, and to obviate this drawback, one must take the precaution to close off one of the views during its partial passage before the window. I obtain this result by the use of a movable frame which in the case of the embodiment shown in Figs. 8 and 9 comprises a special rotatable shutter $i$ consisting of a disk actuated by the gear wheels of the apparatus. The said disk rotates in the same plane as the window $a$ and as close as possible to the film $f$, and makes a complete rotation for one passage of a view of the film. The said shutter also serves to limit the images and to prevent the two images from being projected at the same time. As shown in Fig. 9, the device is provided with an opening of spiral shape $j$; the imperforate parts or spokes $k$ serve to support the peripheral part of the disk, obviating at the same time all abrupt succession of light. One of the radial parts $l$ is made wider, and corresponds to the passage of the edge of the prism at the moment of the substitution of the images, thus affording a more complete closing of the light and avoiding all confusion in the projection, at the moment of the substitution of the images of two consecutive views.

It should be noted that the forward movement of the film and the movement of rotation of the disk $i$ are correlative; in these conditions, the spiral groove $j$ has the exact height of one view, and as the disk continues to rotate, it accompanies the film view when descending. Upon attaining the lower part of the window $a$, the peripheral part of the spiral now ends, while at the same time the central part of the said spiral comes before the window and will exactly frame in the succeeding view on the film, then accompanying it in its descent. In this manner the view-limiting shutter *i* will successively give passage to the light coming from a single view, and obviates all possibility of a simultaneous double projection of two views.

Figure 10:
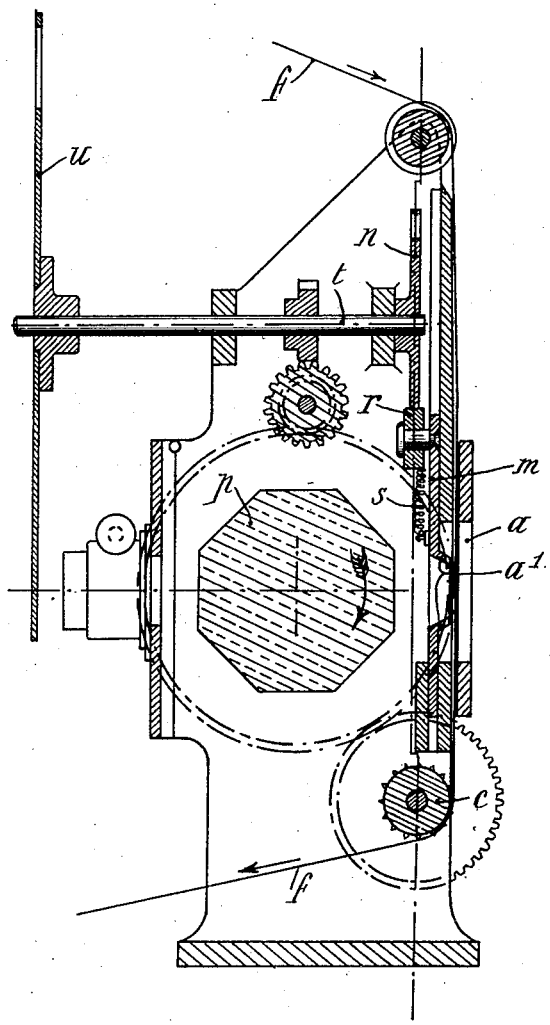

In the modification shown in Figs. 10 and 11, the shutter and the movable frame or image-limiting device are distinct from one another. The latter, which has an alternate motion, consists of a plate *m* which is slidable before the window *a;* the said plate has an opening with two edges or flanged edges *a'* which nearly touch the film *f*, thus framing in a single view and following its movement of descent in the window. Upon attaining its lower position, the plate *m* rapidly rises to its upper position in order to frame in the next view and to follow its descent, and so on for all the views of the film. This descending movement at uniform speed followed by a very rapid return movement is controlled by an eccentric *n* bearing against the roller *r* which is mounted on the plate *m* (Fig. 11). The two springs *s* urge the said plate constantly against the eccentric *n* by means of the roller *r*.

The eccentric *n* is secured to the shaft *t* of an ordinary shutter *u*, so that each time the limiting device *m* rises, the projection is cut off by the said shutter which remains open during the period of descent of the said limiting device.

Obviously, all suitable modifications may be made in the above-described devices without departing from the principle of the invention.

What I claim is:

1. In apparatus for cinematographic projection, film feeding means and a prism rotated in synchronism with said means, in combination with means synchronized to said prism to move the film to and from the prism.

2. In apparatus for cinematographic projection, continuous film feeding means and a prism rotated in synchronism with said means, in combination with means to produce relative movement of film and prism in synchronism with the rotation of the prism.

3. In an apparatus for cinematographic projection, means for drawing forward the film in a continuous motion, a prism having an even number of faces, means for rotating the said prism in a continuous manner and at a speed synchronous with that of the film, whereby one face of the prism will be substituted for the preceding while the film advances by one view, and means for alternately moving the film towards or from the said prism during the travel of the film, whereby the virtual image of the film in the prism shall be maintained in the same plane.

4. In apparatus for cinematographic projection, film feeding means, a prism rotated in synchronism with the film movement, and a frame for the pictures and through which the film passes, in combination with mechanism reciprocating the frame in synchronism with the rotation of the prism.

5. In apparatus for cinematographic projection, mechanism for feeding film, a prism and rotating means therefor geared to said feeding mechanism, a frame through which the film passes and frame reciprocating mechanism geared to said prism rotating means.

In testimony that I claim the foregoing as my invention, I have signed my name hereto.

CLAUDIO BARADAT.